(12) United States Patent
Burton

(10) Patent No.: US 6,896,272 B1
(45) Date of Patent: May 24, 2005

(54) CART

(76) Inventor: Jacqueline J. Burton, 163-19 130 Ave. # 10 E, Jamaica, NY (US) 11434

( * ) Notice: Subject to any disclaimer, the term of this patent is extended or adjusted under 35 U.S.C. 154(b) by 0 days.

(21) Appl. No.: 10/122,907

(22) Filed: Apr. 12, 2002

(51) Int. Cl.$^7$ ................................................ B62B 11/00
(52) U.S. Cl. ............................ 280/47.371; 280/87.021; 119/496
(58) Field of Search ......................... 280/47.34, 47.371, 280/2, 79.2, 79.4, 79.5, 79.11, 651, 655.1, 87.01, 87.021, 33.998; D21/425; D34/12, 14.17, 27, 19, 23, 25; 16/113.1, 405, 429; 119/496, 497; D30/108, 109, 120, 119

(56) References Cited

U.S. PATENT DOCUMENTS

| | | | | |
|---|---|---|---|---|
| 2,675,101 A | * | 4/1954 | Bartlett ........................ | 16/113.1 |
| D206,175 S | * | 11/1966 | Musichuk ................... | D21/425 |
| 3,429,403 A | * | 2/1969 | Dreschler et al. | |
| 4,052,082 A | * | 10/1977 | Jones et al. ............. | 280/87.021 |
| D257,139 S | * | 9/1980 | Bigge ........................... | D34/17 |
| 4,484,540 A | * | 11/1984 | Yamamoto ................... | 119/497 |
| D299,565 S | * | 1/1989 | Lee Hsu ................ | D30/108 X |
| 4,852,520 A | | 8/1989 | Goetz | |
| D313,099 S | * | 12/1990 | Tasley .......................... | D34/17 |
| 5,113,793 A | * | 5/1992 | Leader et al. ............ | 119/497 X |
| 5,141,241 A | * | 8/1992 | Avila ...................... | 280/47.371 |
| D334,087 S | | 3/1993 | Goetz | |
| 5,253,612 A | | 10/1993 | Goetz | |
| D382,309 S | * | 8/1997 | Brown et al. .............. | D21/425 |
| 5,653,458 A | * | 8/1997 | Chaparian .................... | 280/30 |
| 5,694,886 A | | 12/1997 | Hauck | |
| 5,701,843 A | | 12/1997 | Lazides | |
| 5,876,049 A | * | 3/1999 | Spear et al. .......... | 280/47.371 |
| 6,021,740 A | | 2/2000 | Martz | |
| D426,928 S | * | 6/2000 | Pasin .......................... | D34/19 |
| 6,230,656 B1 | * | 5/2001 | Walach ....................... | 119/496 |
| D445,965 S | * | 7/2001 | Licciardello ............... | D30/109 |
| D455,463 S | * | 4/2002 | Martin et al. .............. | D21/425 |
| 6,581,945 B1 | * | 6/2003 | Shapiro ....................... | 280/30 |
| 2002/0140190 A1 | * | 10/2002 | Shapiro | |

* cited by examiner

Primary Examiner—Bryan Fischmann

(57) ABSTRACT

A cart for transporting pet carriers. The cart includes a tray that has a generally rectangular bottom wall and a peripheral wall. A pet carrier securely rests in the tray. The tray has a front wall, a back wall, and a pair of side walls. The front wall has a pair of slots. Each of the side walls has a pair of semicircular grooves along a bottom edge of each of the side walls. Each of the grooves are located adjacent the front and back walls. A handle is pivotally coupled to the front wall. The handle is telescoping such that a length of the handle is selectively variable. The handle is pivotable through each of the slots and positionable on a top surface of the bottom wall. Wheels are rotatably coupled to the tray and are positioned in the grooves. An outer side of the wheels is flush with a corresponding one of the side walls.

6 Claims, 4 Drawing Sheets

CART

BACKGROUND OF THE INVENTION

1. Field of the Invention

The present invention relates to carts and more particularly pertains to a new cart for transporting pet carriers.

2. Description of the Prior Art

The use of carts is known in the prior art. U.S. Pat. No. 5,701,843 describes a pet mobile for transporting pets. Another type of cart is U.S. Pat. No. 5,694,886 a pet kennel having the appearance of a vehicle.

While these devices fulfill their respective, particular objectives and requirements, the need remains for a device that is designed to transport standard pet carriers that do not have a rolling means.

SUMMARY OF THE INVENTION

The present invention meets the needs presented above by providing a rolling cart suitable for resting a pet carrier on.

Still yet another object of the present invention is to provide a new cart that is compact in design making it portable.

To this end, the present invention generally comprises a tray that has a generally rectangular bottom wall and a peripheral wall. A pet carrier securely rests in the tray. The tray has a front wall, a back wall, and a pair of side walls. The front wall has a pair of slots. Each of the side walls has a pair of semicircular grooves along a bottom edge of each of the side walls. Each of the grooves are located adjacent the front and back walls. A handle is pivotally coupled to the front wall. The handle is telescoping such that a length of the handle is selectively variable. The handle is pivotable through each of the slots and positionable on a top surface of the bottom wall. Wheels are rotatably coupled to the tray and are positioned in the grooves. An outer side of the wheels is flush with a corresponding one of the side walls.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

The objects of the invention, along with the various features of novelty which characterize the invention, are pointed out with particularity in the claims annexed to and forming a part of this disclosure.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
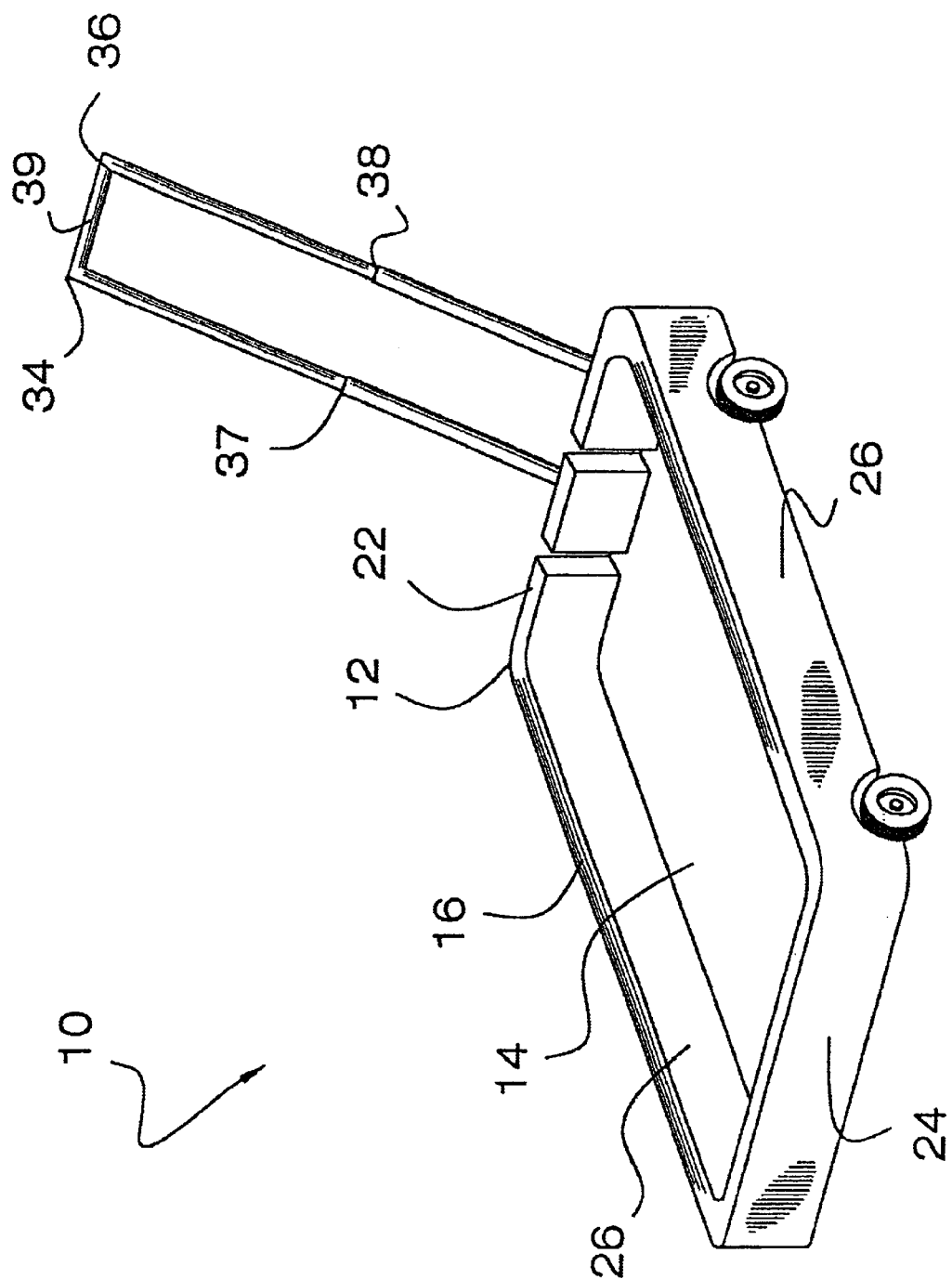
FIG. 1 is a schematic perspective view of a new cart with the handle extended according to the present invention.
Figure 2:
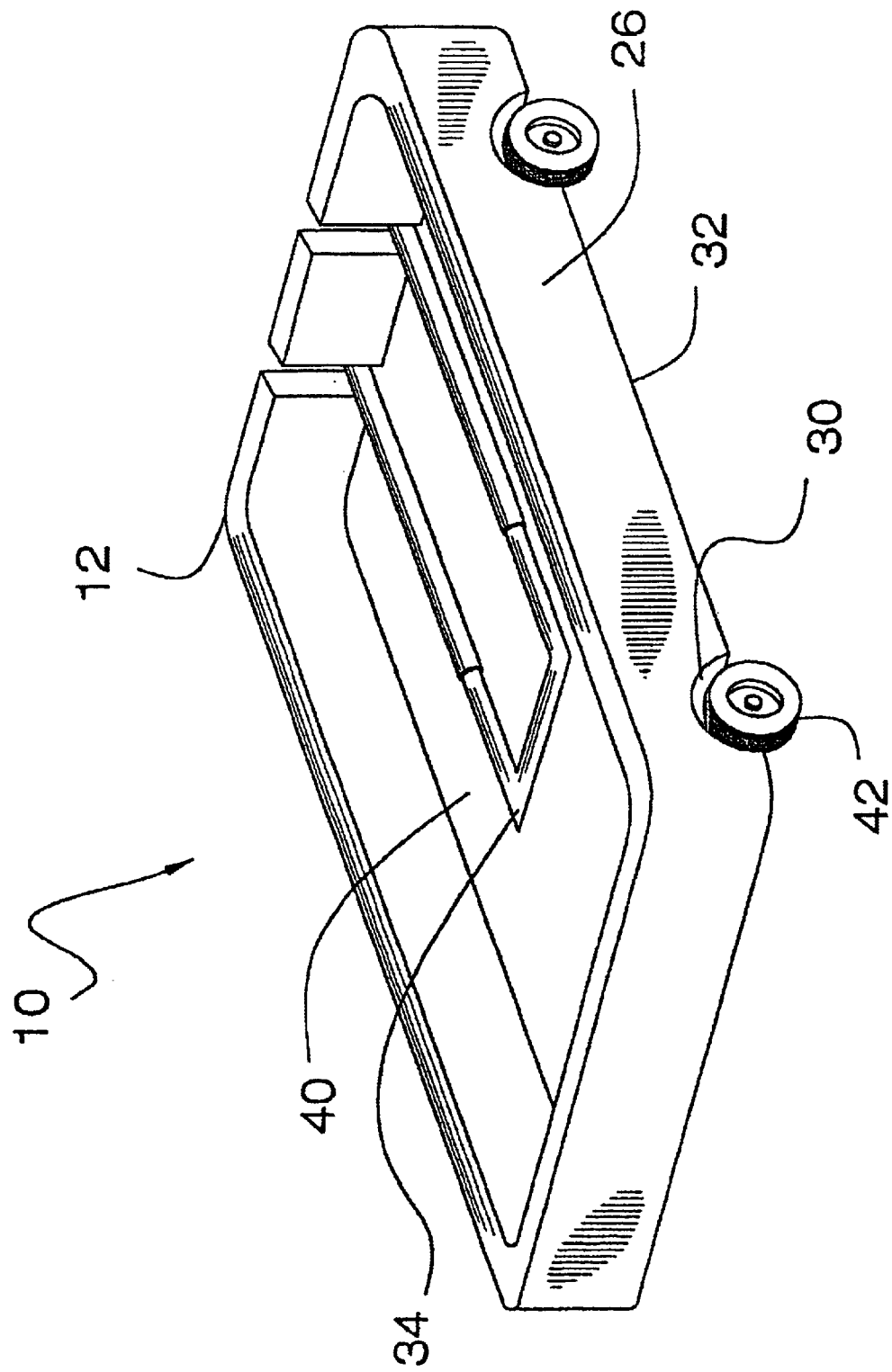
FIG. 2 is a schematic perspective view of the present invention with the handle retracted and folded down.
Figure 3:
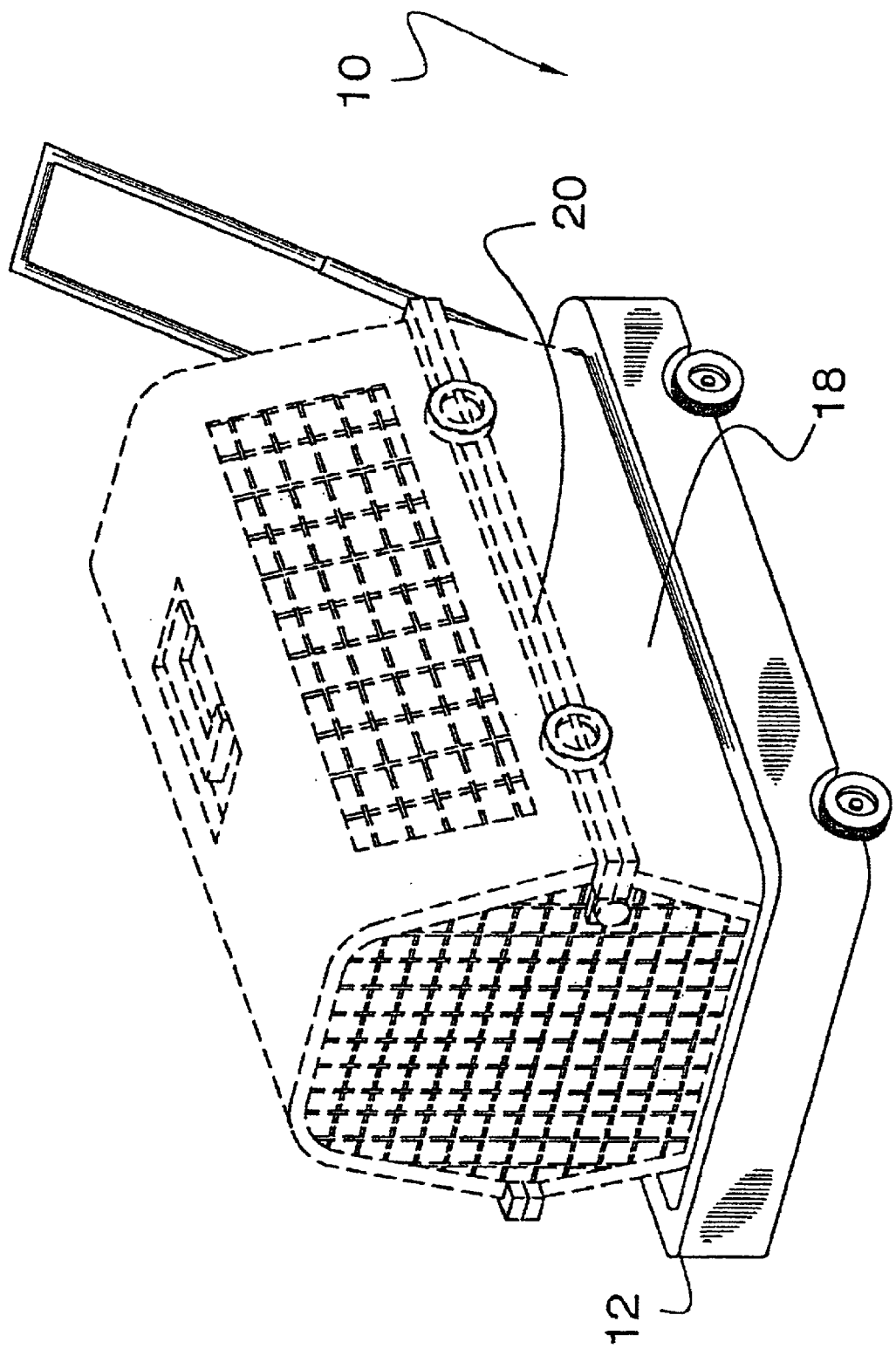
FIG. 3 is a schematic perspective view of the present invention with a pet carrier.
Figure 4:
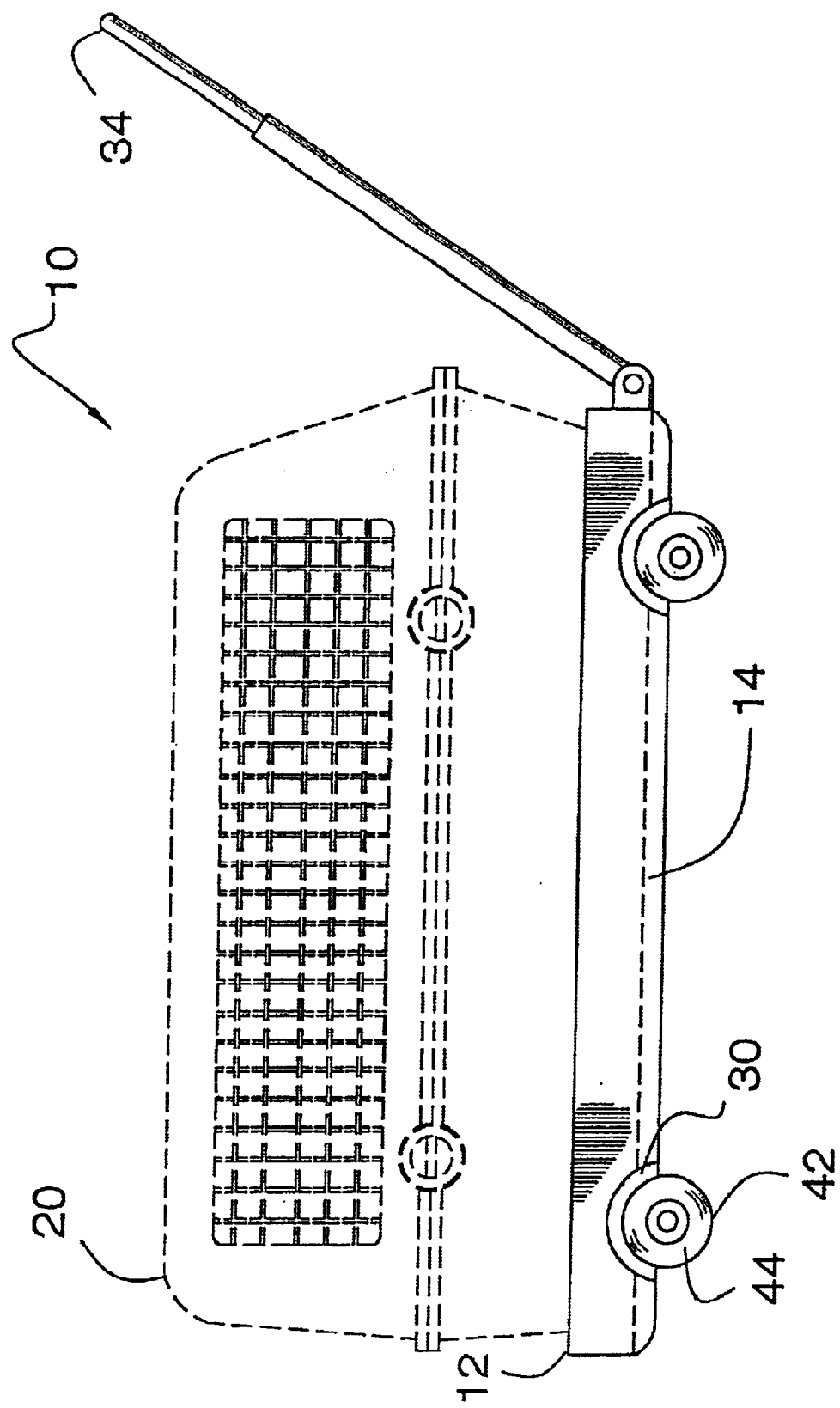
FIG. 4 is a schematic side view of the present invention with a pet carrier.

With reference now to the drawings, and in particular to FIGS. 1 through 4 thereof, a new cart embodying the principles and concepts of the present invention and generally designated by the reference numeral 10 will be described.

As best illustrated in FIGS. 1 through 4, the cart 10 generally comprises a tray 12 that has a generally rectangular bottom wall 14 and a peripheral wall 16 that is attached to and extends upward therefrom.

Dimensions of the tray 12 are generally equal to dimensions of a bottom portion 18 of a pet carrier 20 such that the pet carrier 20 securely rests in the tray 12.

The tray 12 has a front wall 22, a back wall 24, and a pair of side walls 26.

The front wall 22 has a pair of slots 28 extending therethrough. Each of the slots 28 is positioned equidistant from a central longitudinal axis of the tray 12 and on opposing sides thereof.

Each of the side walls 26 has a pair of semicircular grooves 30 therein and positioned along a bottom edge 32 of each of the side walls 26. Each of the grooves 30 are located adjacent the front and back walls 22, 24.

A handle 34 for moving the tray 12 is pivotally coupled to the front wall 22 of the tray 12. The handle 34 comprises a U-shaped bar 36 with a first leg 37, a second leg 38, and a middle portion 39. The legs 37, 38 are telescoping such that a length of the handle 34 is selectively variable. The handle 34 is pivotable through each of the slots 28 and positionable on a top surface 40 of the bottom wall.

A plurality of wheels 42 is rotatably coupled to the tray 12. Each of the wheels 42 is positioned in one of the grooves 30 of the tray 12. Each of the wheels 42 has a width generally equal to a depth of each of the grooves 30 such that an outer side 44 of the wheels 42 is flush with a corresponding one of the side walls 26.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claims:

1. A cart for transporting pet carriers, said cart comprising:

a tray having a generally rectangular bottom wall and a peripheral wall attached to and extending upwardly therefrom, said peripheral wall comprising a front wall, a back wall, and a pair of side walls;

a handle for moving said tray being pivotally coupled to said tray; a plurality of wheels being rotatable coupled to said tray;

said tray comprising an extension portion, said extension portion being coupled to said front wall such that said extension portion extends outwardly from said front wall, said handle being pivotally coupled to said extension portion opposite said front wall such that said handle is pivotable with respect to said tray and is not hindered by the pet carriers that extend over said tray;

said handle comprising a U-shaped bar, said bar having a first leg, a second leg, and a middle portion; and said handle being pivotable through each of a plurality of slots extending through said front wall of said tray and positionable on a top surface of said bottom wall;

each of said side walls having a pair of semicircular grooves therein and positioned along a bottom edge of each of said side walls.

2. The cart as set forth in claim 1, further comprising each of said grooves being located adjacent said front and back walls.

3. The cart as set forth in claim 1, further comprising said legs being telescoping such that a length of said handle is selectively variable.

4. The cart as set forth in claim 1, further comprising each of said wheels being positioned in one of said grooves of said tray.

5. The cart as set forth in claim 1, further comprising each of said wheels having a width generally equal to a depth of each of said grooves such that an outer side of said wheels is flush with a corresponding one of said side walls.

6. A cart for transporting pet carriers, said cart comprising:

a tray having a generally rectangular bottom wall and a peripheral wall attached to and extending upwardly therefrom, wherein dimensions of said tray portion are generally equal to dimensions of a bottom portion of a pet carrier such that the pet carrier securely rests in said tray portion, said tray having a front wall, a back wall, and a pair of side walls, said front wall having a pair of slots extending therethrough, each of said slots being positioned equidistant from a central longitudinal axis of said tray and on opposing sides thereof, each of said side walls having a pair of semicircular grooves therein and positioned along a bottom edge of each of said side walls, each of said grooves being located adjacent said front and back walls;

a handle for moving said tray being pivotally coupled to said tray, said handle comprising a U-shaped bar, said bar having a first leg, a second leg, and a middle portion, said legs being telescoping such that a length of said handle is selectively variable, said handle being pivotable through each of said slots and positionable on a top surface of said bottom wall;

said tray comprising an extension portion, said extension portion being coupled to said front wall such that said extension portion extends outwardly from said front wall, said handle being pivotally coupled to said extension portion opposite said front wall such that said handle is pivotable with respect to said tray and is not hindered by the pet carriers that extend over said tray; and a plurality of wheels being rotatably coupled to said tray, each of said wheels being positioned in one of said grooves of said tray, each of said wheels having a width generally equal to a depth of each of said grooves such that an outer side of said wheels is flush with a corresponding one of said side walls.

* * * * *